US007472133B2

(12) United States Patent
Freedman et al.

(10) Patent No.: US 7,472,133 B2
(45) Date of Patent: Dec. 30, 2008

(54) SYSTEM AND METHOD FOR IMPROVED PREFETCHING

(75) Inventors: Craig S. Freedman, Sammamish, WA (US); Gang He, Woodinville, WA (US); Goetz Graefe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 10/909,037

(22) Filed: Jul. 30, 2004

(65) Prior Publication Data

US 2006/0026386 A1 Feb. 2, 2006

(51) Int. Cl.
G06F 17/00 (2006.01)
(52) U.S. Cl. .................. 707/103 Y; 707/7; 707/101; 707/102; 707/104.1; 707/205
(58) Field of Classification Search .......... 707/3, 707/10, 102, 100, 103 Y, 104.1, 204, 205, 707/101, 7; 711/137, 213; 370/236; 712/205
See application file for complete search history.

(56) References Cited

U.S. PATENT DOCUMENTS

| | | | | | |
|---|---|---|---|---|---|
| 5,355,478 | A | * | 10/1994 | Brady et al. | 707/7 |
| 5,487,166 | A | * | 1/1996 | Cossock | 707/7 |
| 6,085,193 | A | * | 7/2000 | Malkin et al. | 707/10 |
| 6,567,815 | B1 | * | 5/2003 | Rubin et al. | 707/101 |
| 6,687,807 | B1 | * | 2/2004 | Damron | 712/205 |
| 6,772,179 | B2 | * | 8/2004 | Chen et al. | 707/204 |
| 6,782,454 | B1 | * | 8/2004 | Damron | 711/137 |
| 6,973,542 | B1 | * | 12/2005 | Schmuck et al. | 711/137 |
| 2003/0126116 | A1 | * | 7/2003 | Chen et al. | 707/3 |
| 2005/0102294 | A1 | * | 5/2005 | Coldewey | 707/100 |
| 2005/0237941 | A1 | * | 10/2005 | Beers et al. | 370/236 |
| 2006/0004792 | A1 | * | 1/2006 | Lyle et al. | 707/100 |

OTHER PUBLICATIONS

Seungryul Choi et al., "A General Framework for Prefetch Scheduling in Linked Data Structures and its Application to Multi-chain Prefetching", ACM, May 2004, pp. 214-280.*
Tatshshi Inagaki et al., "Stride Prefetching by Dynamically Inspecting Objects", ACM, Jun. 2003, pp. 269-277.*
Josefin Hallberg et al., "Cache-Conscious Allocation of Pointer-based Data Structures Revisited with HW/SW Prefetching", IEEE, 2003, pp. 1-12.*
Annavaram, M. et al., "Call Graph Prefetching for Database Applications", *ACM Transactions on Computer Systems*, 2003, 21(4), 412-444.
Bernstein, P.A. et al., "Context-Based Prefetch- An Optimization for Implementing Objects on Relations", *The VLDB Journal*, 2000, 9, 177-189.
Roth, A. et al., "Dependence Based Prefetching for Linked Data Structures", *ASPLOS*, 1998, 115-126.
Smith, A.J., "Sequentiality and Prefetching in Database Systems", *ACM Transactions on Database Systems*, 1978, 3(3), 223-247.
Wedekind, H. et al., "Prefetching in Realtime Database Applications", *ACM*, 1986, 215-226.

* cited by examiner

*Primary Examiner*—Thuy N Pardo
(74) *Attorney, Agent, or Firm*—Woodcock Washburn LLP

(57) ABSTRACT

The present invention is directed to systems and methods for improved prefetching. The present invention reduces the processing time and associated costs of prefetching by incorporating a number of techniques for efficiently searching a node structure. Such techniques eliminate redundant traversal of nodes. Additionally, such techniques do not require locking the node structure to prevent concurrent updates. Furthermore, such techniques may exploit known key ordering information to optimize a search.

38 Claims, 10 Drawing Sheets

SYSTEM AND METHOD FOR IMPROVED PREFETCHING

FIELD OF THE INVENTION

The present invention relates to the field of data storage and retrieval, and, more specifically, to page prefetching.

BACKGROUND OF THE INVENTION

Prefetching is a technique that is commonly used in connection with database management systems (DBMS's) and other data storage and retrieval systems. Prefetching substantially improves the performance of queries and data manipulation language (DML) statements by reducing the amount of time required to perform input/output operations. Specifically, prefetching may enable a single processing thread to keep multiple disks active. Prefetching may also enable central processing unit (CPU) and I/O parallelism by issuing asynchronous input/output operations.

Prefetching is typically performed using a special prefetch iterator, which may be implemented by a DBMS query optimizer. The prefetch iterator may be inserted on the outer side of a nested loop join where the inner side of the join contains a correlated range scan. The prefetch iterator may also be inserted as the input to an insert, update, or delete iterator. The prefetch iterator may buffer a large quantity of rows, which may vary depending on factors such as, for example, the version of the DBMS and the amount of available memory. The prefetch operator then issues prefetch requests based on the buffered rows. As these input/output operations complete, the corresponding rows are returned to a prefetch consumer iterator such as, for example, a range or DML iterator.

Although it dramatically improves input/output operation performance, there are a number of drawbacks related to conventional prefetching. For example, if the prefetch iterator requires a page that is not in the buffer pool, then the prefetch operation stalls and waits until the missing page becomes available. During this waiting period, other input/output operations or return rows for completed input/output operations may be issued. Importantly, once the missing page becomes available, the prefetch iterator resumes the prefetch operation from its original initiation point (i.e. a root node), thereby repeating the same page searches that have already been completed. Such repetition increases the processing time for the prefetch operation, and, if the prefetch iterator encounters multiple page misses, then the delay due to repetition is multiplied.

An exemplary prefetch operation that encounters a missing page is depicted in FIG. 1. The prefetch operation traverses node structure 101 which may be, for example, a b tree or a version store. The prefetch operation target data may be, for example, disk pages identified by a list of key values. The target data is located in leaf node 101*h*, as indicated by the node's square shape. The prefetch operation is initiated at root node 101*a* and continues through second level node 101*b*, as shown by the thick lines and directional arrows indicating the prefetch path. Third level node 101*d* is a missing node, as indicated by the dashed lines surrounding the node. Thus, when the prefetch reaches missing node 101*d*, the operation stalls and waits for missing node 101*d* to become available. When node 101*d* becomes available, the prefetch resumes from root node 101*a* rather than node 101*d*, thereby repeating the traversal of nodes 101*a* and 101*b*.

Another drawback of conventional prefetching is that, once a prefetch operation is completed, the prefetch consumer iterator duplicates the entire node structure traversal performed by the prefetch iterator. For example, after a prefetch iterator traverses nodes 101*a* to 101*h* as shown in FIG. 2, the prefetch consumer iterator will repeat the entire same traversal. The repeated traversal of nodes 101*a*, 101*b*, 101*d*, and 101*f* could be eliminated by initiating the prefetch consumer operation directly from node 101*h* rather than from root node 101*a*.

Yet another drawback of conventional prefetching is that it fails to exploit ordered key lists. Specifically, for such ordered key lists, it is likely that each key will be located on a page that is either identical or in very close proximity to the page of the proceeding key in the list. For example, referring again to FIG. 2, if a third key is located in leaf node 101*h*, then it is highly likely that a fourth key will be located either in leaf node 101*f* or in sibling leaf node 101*i*. However, despite this ordered relationship, in conventional prefetch operation are always initiated from root node 101*a*. If, as is likely, the fourth key is located in nodes 101*f* or 101*i*, then the traversal of nodes 101*a*, 101*b*, 101*d*, and 101*f* will be repeated.

Thus, there is a need in the art for systems and methods for improved prefetching that eliminate the drawbacks of conventional prefetching. The present invention satisfies these and other needs.

SUMMARY OF THE INVENTION

The present invention is directed to systems and methods for improved prefetching. The present invention reduces the processing time and associated costs of prefetching by incorporating a number of techniques for efficiently searching a node structure. Such techniques eliminate redundant traversal of nodes. Additionally, such techniques do not require locking the node structure to prevent concurrent updates. Furthermore, such techniques may exploit known key ordering information to optimize a search.

According to an aspect of the invention, when a prefetch stalls upon encountering a missing node in a node structure, state information associated with nodes in the prefetch path may be stored. When the prefetch resumes, the stored state information may be used to identify a parent of the missing node and to determine whether the parent node has been changed since the prefetch stalled. If the parent node has remained unchanged, then the prefetch may resume directly from the missing node, thereby eliminating a repeated traversal of the missing node's ancestor nodes. Additionally, even if the parent node has changed, it may be searched, and, if it still includes the target data, then the prefetch may also resume directly from the missing node.

According to another aspect of the invention, upon completing a prefetch at a completion node, state information associated with nodes in the prefetch path may be stored. Upon initiating a subsequent prefetch consumer operation, the state information may be used to identify the completion node and to determine whether the completion node has been changed since the completion of the earlier prefetch. If the completion node has remained unchanged, then the prefetch consumer operation may be initiated directly from the completion node, thereby eliminating the repeated traversal of the completion node's ancestor nodes. Additionally, even if the completion node has changed, it may be searched, and, if it still includes the target data, then the prefetch consumer operation may also resume directly from the completion node.

According to another aspect of the invention, ordering information from a key list may be used to further optimize prefetching operations. Upon completing a prefetch of a key in the list, state information associated with nodes in the prefetch path may be stored. Upon initiating a subsequent prefetch for the subsequent key in the list, the state information may be used to identify an initiation node, which is one of the nodes in the path of the prior prefetch. The subsequent prefetch may then be initiated directly from the initiation node.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

The present invention is directed to systems and methods for improved prefetching. Such systems and methods may be applicable in operations such as, for example, prefetch operations encountering a missing node, prefetch consumer operations, and prefetch operations in connection with an ordered key list. The application of the present invention to each of these three operations is described in detail below. Generally, the present invention employs a number of improved techniques for searching a node structure such as, for example, a b tree or a version store. The improved techniques may involve storing state information associated with one or more nodes to enable a future identification of such nodes and, if necessary, a determination of whether such nodes have been changed during a time period of interest.

The improved techniques described below may be used in connection with prefetching of a wide range of data, including, but not limited to, data such as, for example, large objects, within which a portion of the data is off row data. Off row data is data that is stored outside of a corresponding node in a separate node structure.

I. Prefetch Operations Encountering a Missing Node

Figure 1:
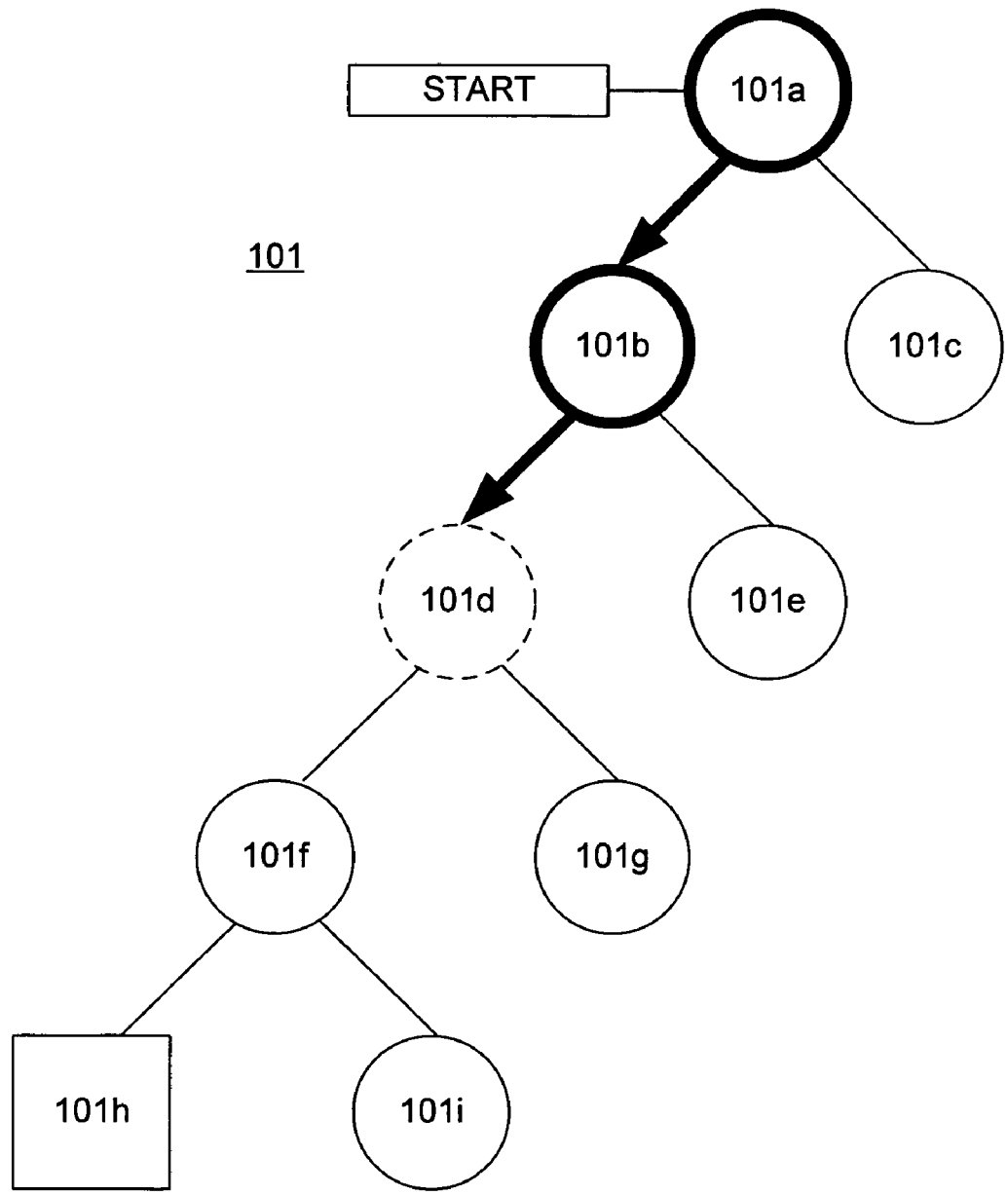
FIG. 1 depicts an exemplary prior art prefetching operation that encounters a missing node.
Figure 2:
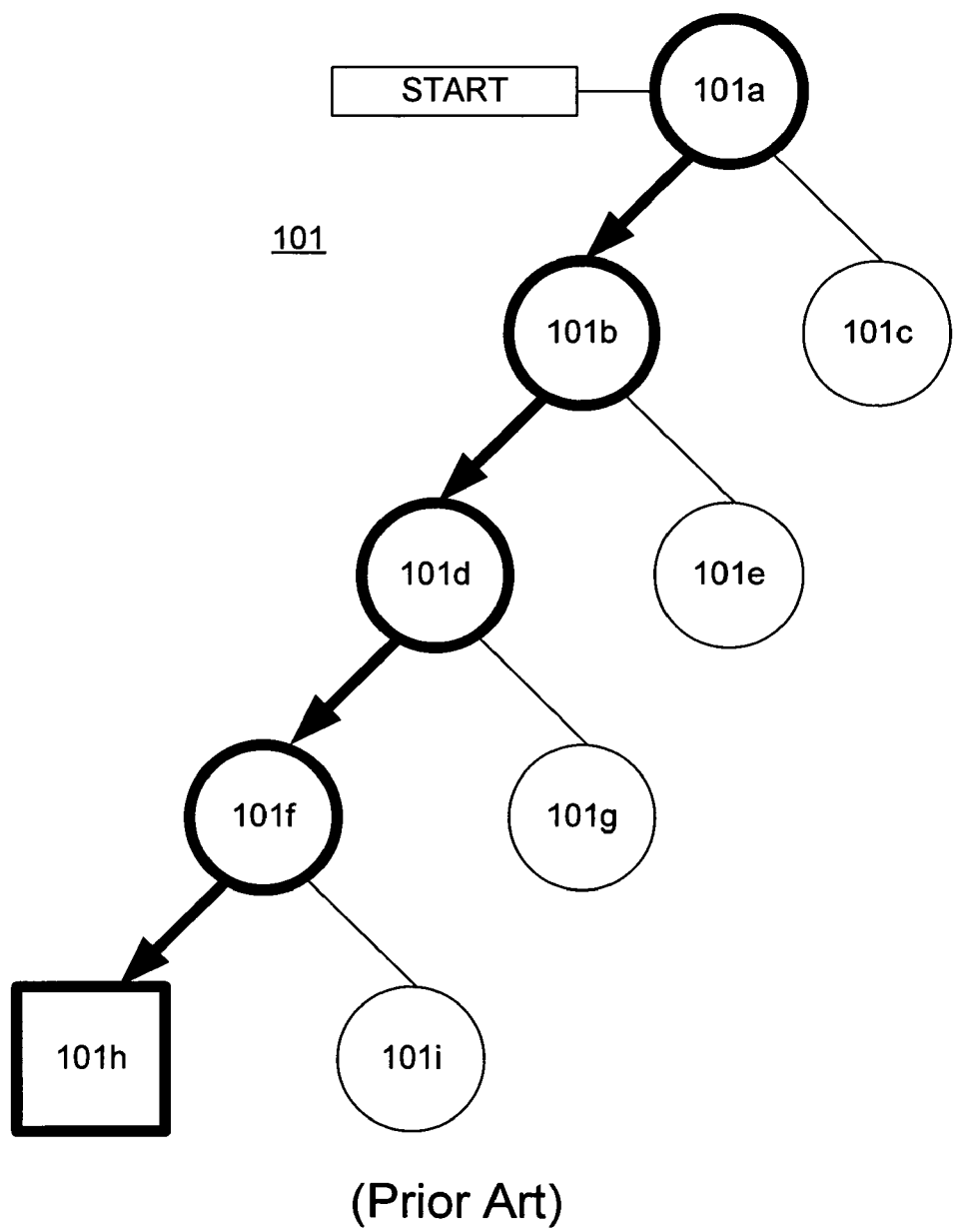
FIG. 2 depicts an exemplary completed prior art prefetching operation.
Figure 3:
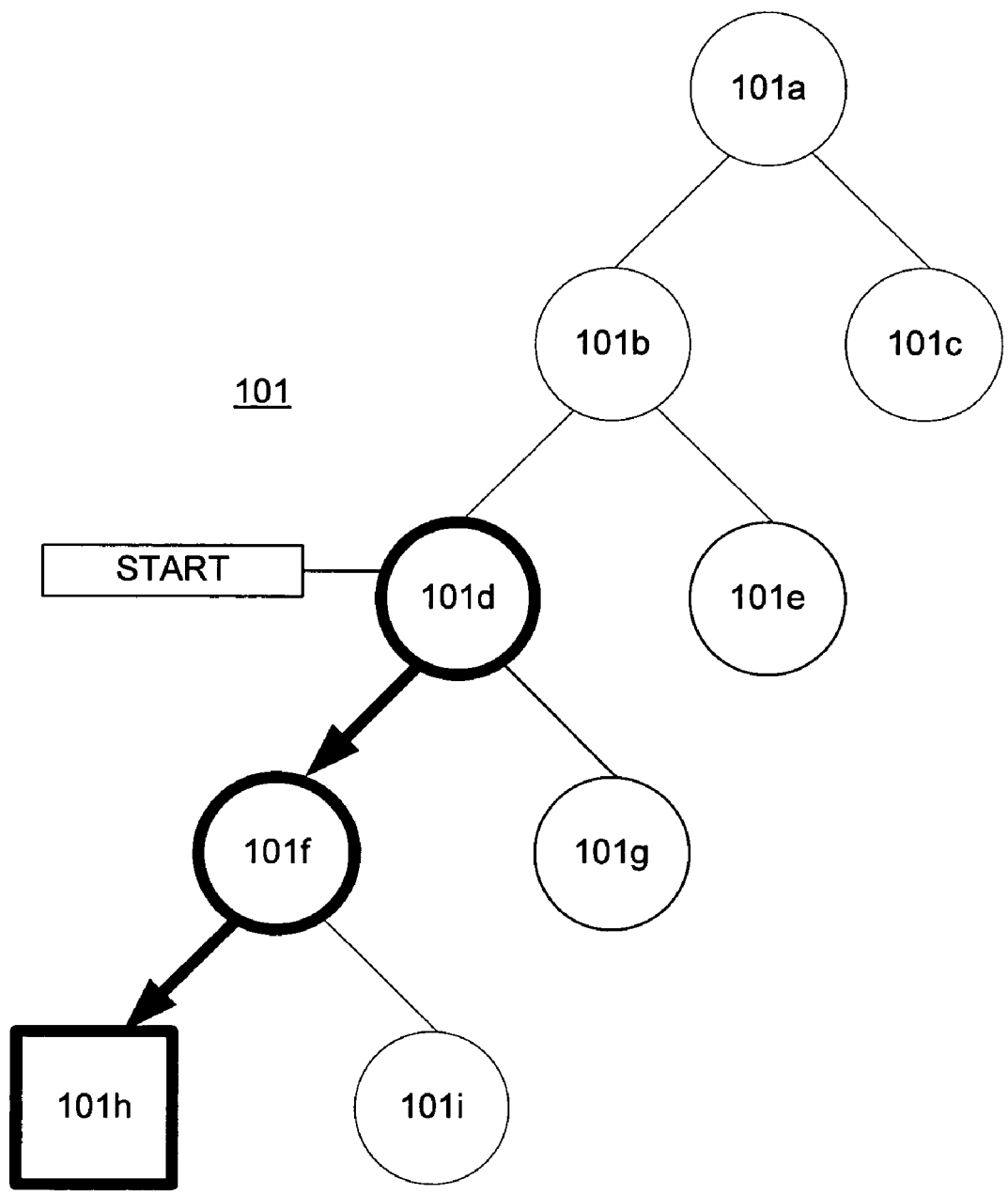
FIG. 3 depicts an exemplary prefetching operation resumed after encountering a missing node in accordance with the present invention.

As described above, when, during a search of a node structure, a prefetch encounters a missing node, the prefetch will stall and wait for the missing node to become available. For example, referring to FIG. 1, when a prefetch encounters missing node 101$d$, the prefetch will stall at the above node 101$b$ until node 101$d$ becomes available. As also described above, a drawback of conventional prefetching is that, as shown in FIG. 2, when the missing node 101$d$ becomes available, the prefetch will resume from the root node 101$a$ rather than from node 101$d$, thereby repeating the traversal of nodes 101$a$ and 101$b$. By contrast, as shown in FIG. 3, the present invention eliminates this unnecessary repetition, resuming the traversal of the node structure from node 101$d$.

Figure 4:
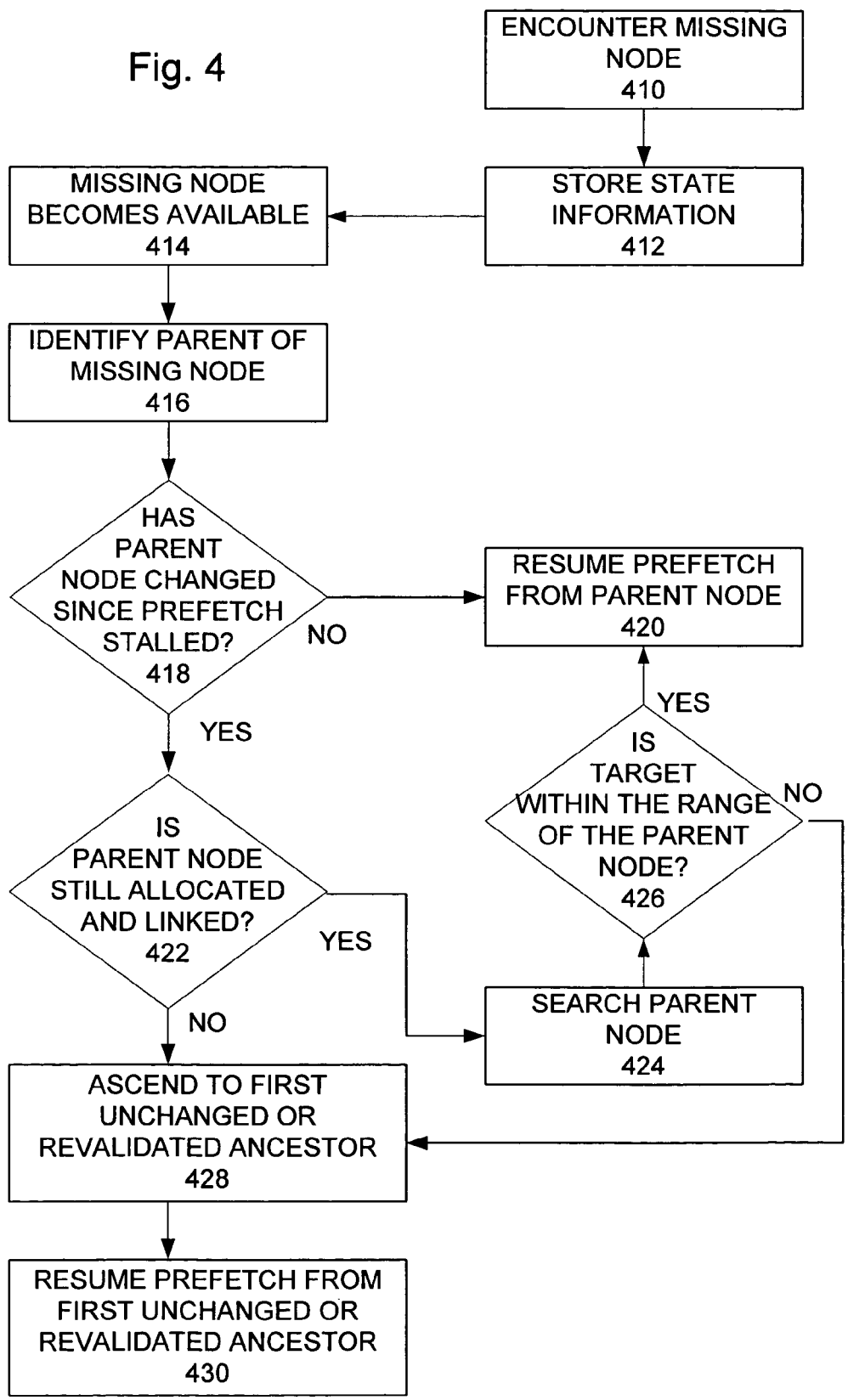
FIG. 4 is a flowchart of an exemplary method for resuming a prefetch operation after encountering a missing node in accordance with the present invention.

A flowchart of an exemplary method for resuming a prefetch after encountering a missing node in accordance with the present invention is shown in FIG. 4. At step 410, the prefetch encounters a missing node 101$d$ and stalls until the missing node 101$d$ becomes available. At step 412, upon encountering the missing node, state information may be stored for the missing node and its ancestor nodes along the prefetch path (i.e. nodes 101$b$ and 101$d$). For each such node, the state information may include a corresponding node identifier and also a corresponding change sequence number (CSN). The CSN identifies a last change in a sequence of changes recorded at the associated node. The CSN may be, for example, a log sequence number (LSN). The state information may also include other information such as, for example, a slot identifier pointing from each parent node to its child node.

At step 414, the missing node 101$d$ becomes available and the prefetch is resumed. At step 416, upon resuming the prefetch, the parent node 101$b$ is identified. The parent node 101$b$ may be identified based on the parent node identifier that may be stored as part of the state information at step 412. At step 418, it is determined whether the parent node 101$b$ has been changed since the prefetch stalled at step 410. This determination may be made based on the parent node CSN that may be recorded as part of the state information at step 412. Specifically, the parent node CSN stored at step 412 may be compared with a current parent node CSN. If the current parent node CSN is greater than the stored parent node CSN, then the parent node 101$b$ has been changed. If the current parent node CSN is the same as the stored parent node CSN, then the parent node 101$b$ has remained unchanged. Through the use of the CSN, the present invention eliminates any need to lock node structure 101 to prevent concurrent updates while waiting for the missing node 101$d$ to be brought into memory from disk.

If, at step 418, it is determined that the parent node 101$b$ has not been changed, then, at step 420, the prefetch may be resumed directly from the formerly missing node 101$d$, thereby eliminating the repeated traversal of nodes 101$a$ and 101$b$. If, however, at step 418, it is determined that the parent node 101$b$ has been changed, then, at steps 422-426, an attempt is made to "revalidate" the parent node 101$b$. If the parent node is successfully revalidated, then the prefetch may also be resumed from the parent node 101b even if it has changed.

Specifically, at step 422, it is determined whether the parent node 101b is still allocated and linked to the node structure. If so, then, at step 424, the parent node 101b is searched. At step 426, it is determined whether the target data is still within the parent node 101b. If so, then the parent node is successfully revalidated and the target is located within the range of the parent node. If not, then the parent node cannot be revalidated and the prefetch operation must resume from another node.

Steps 428 and 430 depict how another node from which to resume the prefetch operation may be selected. At step 428, node structure 101 is ascended until a first unchanged or revalidated ancestor of missing node 101d can be located. Specifically, to determine whether an ancestor has remained unchanged since the prefetch stalled, the CSN for the ancestor stored at step 412 may be compared with a current ancestor CSN. Additionally, if the ancestor has changed, then a revalidation attempt for the ancestor may be performed by repeating steps 422-426 upon the ancestor. Upon locating the first unchanged or revalidated ancestor, at step 430, the prefetch resumes from the first unchanged or revalidated ancestor and descends node structure 101 until the target is located. Alternatively to steps 428 and 430, if the parent node 101b cannot be revalidated, then the prefetch may be resumed directly from root node 101a and may descend node structure 101 until the target is located.

II. Prefetch Consumer Operations

Figure 5:
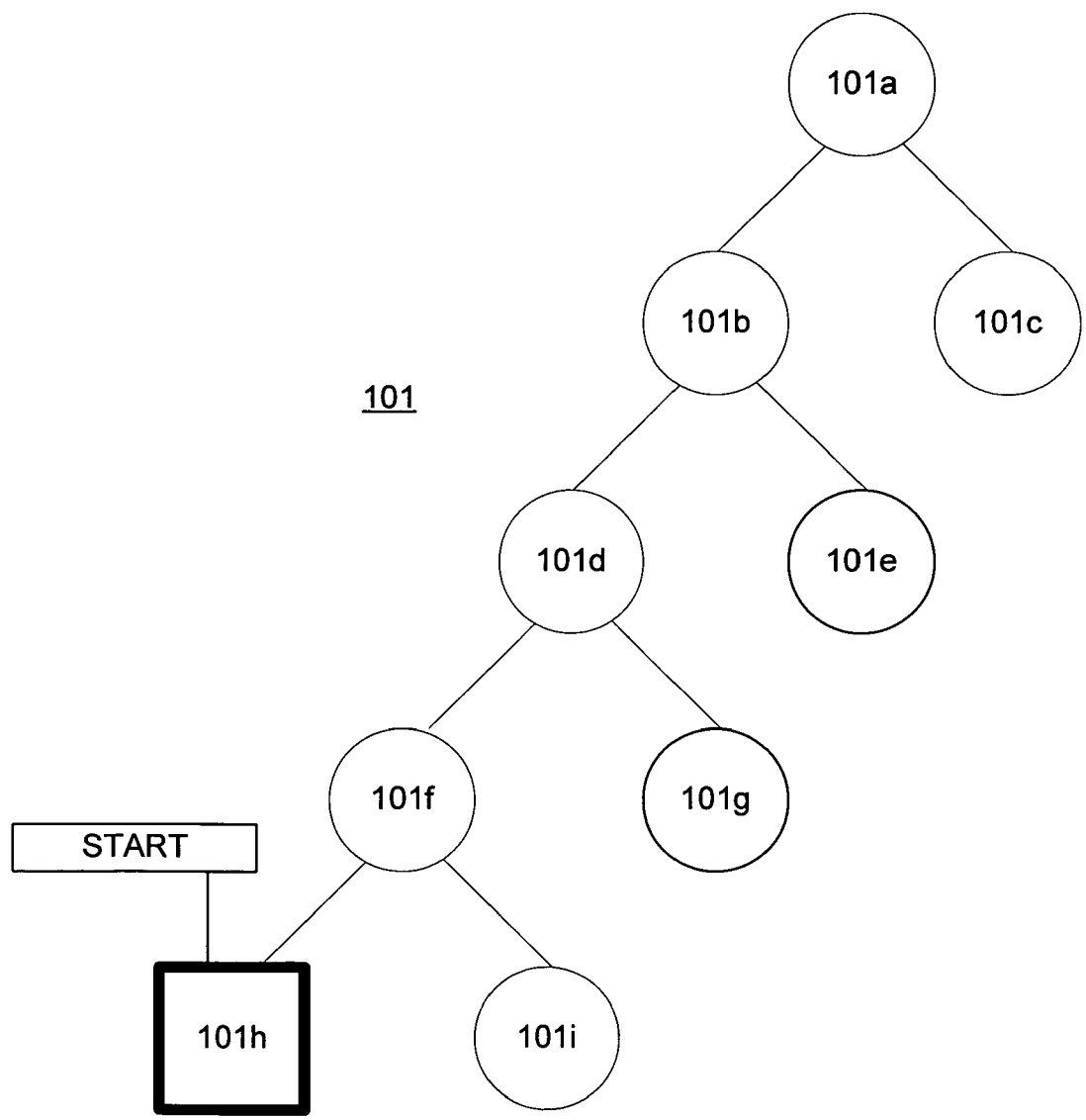
FIG. 5 depicts an exemplary prefetch consumer operation in accordance with the present invention.

The present invention may also be applied in connection with a prefetch consumer iterator such as, for example, a range operation or a data manipulation language (DML) operation. As described above, a drawback of conventional prefetching is that, after a prefetch operation is completed, the prefetch consumer iterator duplicates the entire node structure traversal performed by the prefetch iterator. For example, referring to FIG. 2, after an original prefetch operation has located target data in leaf node 101h, a conventional prefetch consumer iterator will again traverse the entire node structure 101 from root node 101a to leaf node 101h. By contrast, as shown in FIG. 5, the present invention eliminates unnecessary repetition by initiating the prefetch consumer operation directly from the leaf node 101h.

Figure 6:
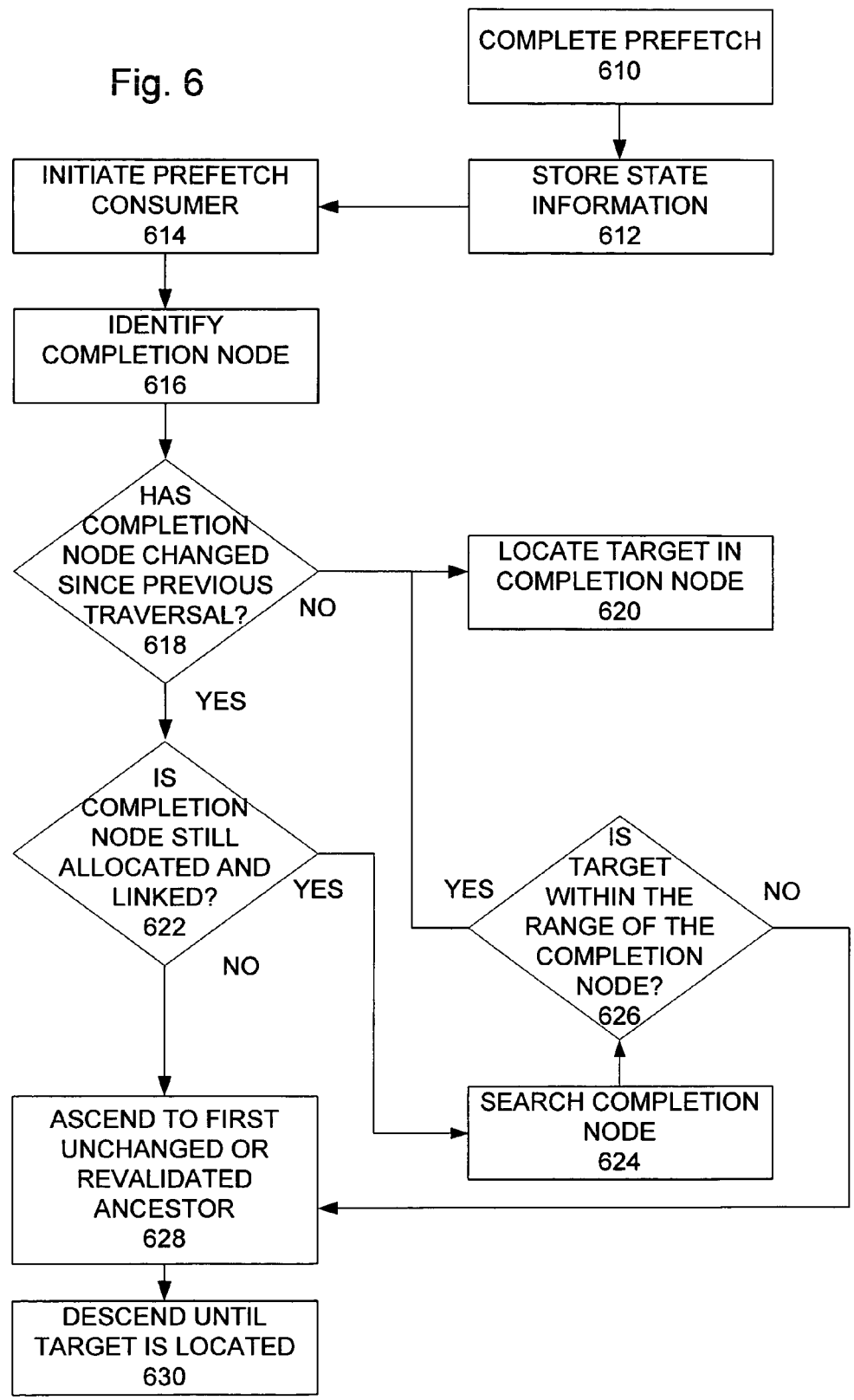
FIG. 6 is a flowchart of an exemplary method for performing a prefetch consumer operation in accordance with the present invention.

A flowchart of an exemplary method for performing a prefetch consumer operation in accordance with the present invention is shown in FIG. 6. At step 610, an original prefetch operation is completed by locating target data in a completion node 101h. At step 612, upon completing the original prefetch, state information is stored for the nodes along the prefetch path (i.e. nodes 101b, 101d, 10f, and 101h). As set forth in the previous section, for each such node, the state information may include, for example, a corresponding node identifier and also a corresponding CSN for each node.

At step 614, the prefetch consumer operation is initiated. At step 616, upon initiating the prefetch consumer operation, the completion node 101h is identified. The completion node 101h may be identified based on the completion node identifier that may be stored, at step 612, as part of the state information. At step 618, it is determined whether the completion node 101h has been changed since the original prefetch operation was completed at step 610. This determination may be made based on the completion node CSN that may be stored, at step 612, as part of the state information. Specifically, the completion node CSN stored at step 612 may be compared with a current completion node CSN. If the current completion node CSN is greater than the stored completion node CSN, then the completion node 101h has been changed. If the current completion node CSN is the same as the stored completion node CSN, then the completion node 101h has remained unchanged.

If, at step 618, it is determined that the completion node 101h has remained unchanged, then, at step 620, the target is located within completion node 101h. If, however, at step 618, it is determined that the completion node 101h has been changed, then, at steps 622-626, an attempt is made to "revalidate" the completion node 101h. If the completion node 101h is successfully revalidated, then the prefetch consumer operation may also be resumed from the completion node 101h even if the completion node 101h has changed.

Specifically, at step 622, it is determined whether the completion node 101h is still allocated and linked to the node structure. If so, then at step 624 the completion node 101h is searched. At step 626, it is determined whether the target data is still within the range of the completion node 101h. If so, then the completion node 101h is successfully revalidated. If not, then the completion node cannot be revalidated and the prefetch consumer operation will resume from another node.

Steps 628 and 630 depict how another node from which to resume the prefetch consumer operation may be selected. At step 628, node structure 101 is ascended from the completion node 101h until a first unchanged or revalidated ancestor of completion node 101h is located. Specifically, to determine whether an ancestor has remained unchanged since the prefetch stalled, the CSN for the ancestor stored at step 612 may be compared with a current ancestor CSN. Additionally, if the ancestor has changed, then a revalidation attempt for the ancestor may be performed by repeating steps 622-626 upon the ancestor. Upon locating the first unchanged or revalidated ancestor, at step 630, the prefetch resumes from the first unchanged or revalidated ancestor and descends node structure 101 until the target is located. Alternatively to steps 628 and 630, if the completion node 101h cannot be revalidated, then the prefetch may be resumed directly from root node 101a and may descend node structure 101 until the target is located.

III. Prefetch Operations in Connection with Ordered Key Lists

As described above, for prefetch operations in connection with ordered key lists, it is likely that each key will be located in close proximity to the completion node for the preceding key in the list. For example, referring again to FIG. 2, if a third key in a list is located in leaf node 101h, then it is likely that a fourth key will be located in close proximity to leaf node 101h (i.e. likely either in leaf node 101h, sibling node 101i, or any subsequent sibling of nodes 101h and 101i that is a child of node 101f). However, despite this ordered relationship, conventional prefetching is always initiated from the root node 101a. By contrast, as depicted again in FIG. 5, the present invention enables a prefetch operation to be initiated directly from the completion node 101h of the preceding prefetch (or, if desired, an ancestor node of the completion node, as will be described in detail below).

Figure 7:
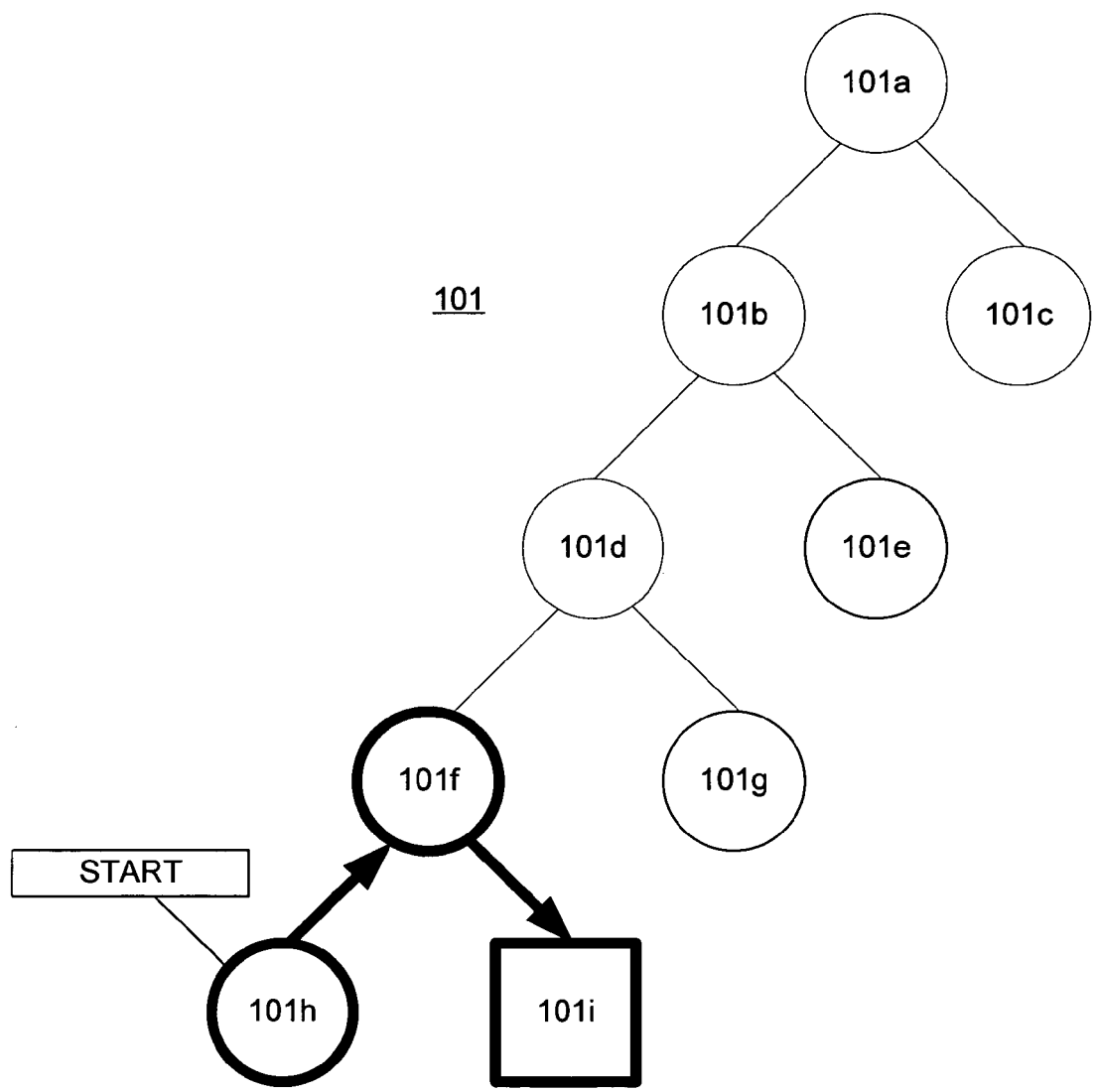
FIG. 7 depicts an exemplary prefetch operation in connection with an ordered key list in accordance with the present invention.

In addition to the example illustrated in FIG. 5, the present invention may also be used to optimize prefetching even if a key is not located in the completion node 101h of the preceding key. Referring now to FIG. 7, the key is now located in sibling node 101i, as indicated by its square shape, rather than in completion node 101h. In this scenario, upon determining that the key is not located in the completion node 101h, the present invention enables, if desired, the prefetch to ascend up the node structure 101 until the key can be located. Specifically, upon examining node 101f, it may be determined that the key is, in fact, in sibling node 101*i*, and the search may then proceed back down node structure 101 to sibling node 101*i*.

For each ancestor node, a corresponding separator key may be stored and used to determine a range of keys covered by the ancestor node. For example, a separator key on node 101*f* may be used to determine whether the subsequent prefetch key shares the same parent 101*f* as the previous prefetch key. However, the separator key cannot be used to specifically identify in which of the children of node 101*f* the subsequent key is actually located. The specific location of the subsequent key is determined by actually searching node 101*f*.

Figure 8:
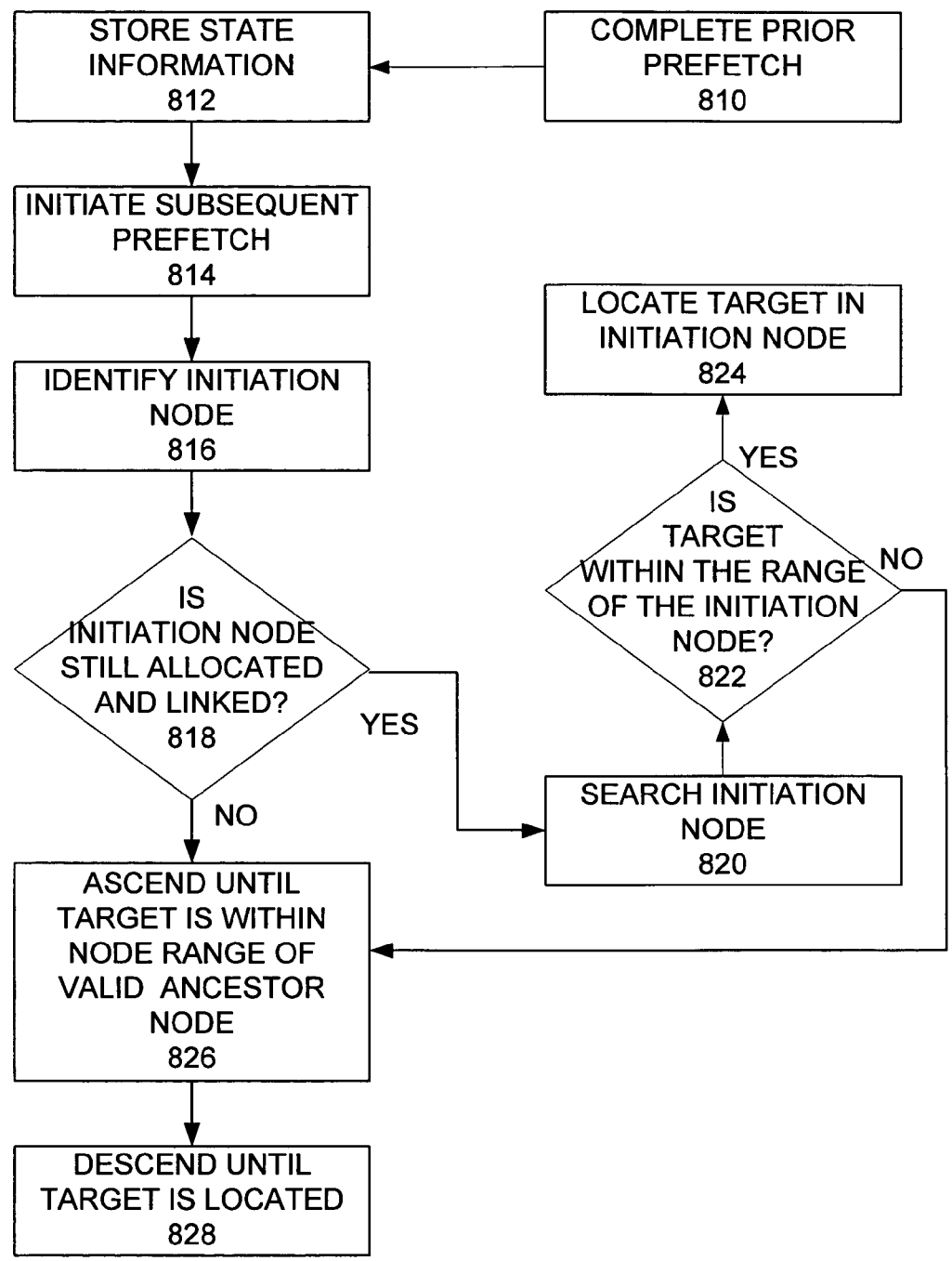
FIG. 8 is a flowchart of an exemplary method for performing a prefetch operation in connection with an ordered key list in accordance with the present invention.

A flowchart of an exemplary method for performing a prefetch in connection with an ordered key list in accordance with the present invention is shown in FIG. 8. At step 810, a prefetch operation is completed by locating a key within a completion node 101*h*. At step 812, upon completing the prefetch, state information is stored for the nodes along the prefetch path (i.e. node 101*b*, 101*d*, 101*f*, and 101*h*). For each such node, the state information may include a corresponding node identifier and also a corresponding separator key as set forth above.

At step 814, a subsequent prefetch is initiated. The subsequent prefetch is performed for a subsequent key in an ordered key list. For example, if the prefetch operation completed at step 810 was performed for a third key in the list, then the subsequent prefetch will be performed for a fourth key. At step 816, upon initiating the subsequent prefetch, an initiation node is identified. The initiation node may be any node along the path of the previous prefetch.

The initiation node may be determined based on the separator keys set forth above, which may be stored as part of the state information at step 812. Namely, starting at the completion node 101*h*, the subsequent key value is compared to the node's corresponding separator key. If the subsequent key value is less than the separator key, then the node is selected as the initiation node. If the subsequent key is greater than or equal to the separator key, then node structure 101 is ascended to a next ancestor node and the subsequent key is compared with the next ancestor node's separator key.

At step 818, it is determined whether the initiation node is still allocated and linked to the node structure. If so, then at step 820 the initiation node is searched. At step 822, it is determined whether the subsequent key is within the range of the initiation node. If so, then, at step 824, the subsequent key is located within the initiation node. If not, then the another node may be searched for the subsequent key.

If the subsequent key is not within the selected initiation node, then, at step 826, node structure 101 is ascended from the initiation node until the subsequent key falls within an ancestor node. Step 826 may be performed by ascending node structure 101 until a first unchanged or revalidated ancestor of the initiation node is located. Specifically, the ancestor is validated by repeating steps 818-822 on the ancestor node. At step 828, node structure 101 is descended from the ancestor node until the subsequent key is located. Alternatively to steps 826 and 828, if the initiation node does not include the subsequent key, then the subsequent search may return to root node 101*a* and descend node structure 101 until the target is located.

IV. Exemplary Network Environment and Computing Device

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the present invention.

Figure 9:
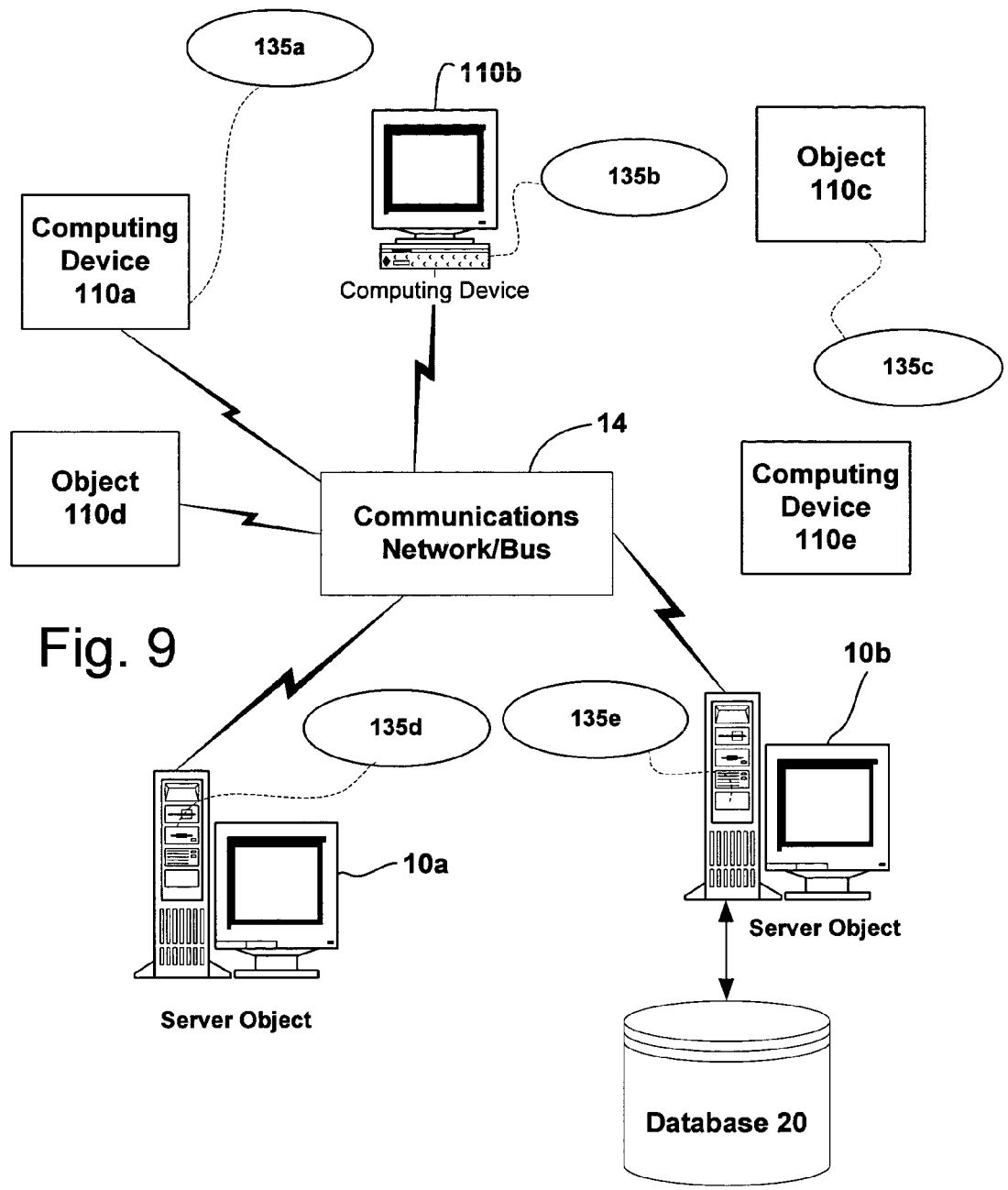
FIG. 9 a block diagram representing an exemplary network environment having a variety of computing devices in which the present invention may be implemented.

FIG. 9 provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, televisions, MP3 players, personal computers, etc.

Each object can communicate with another object by way of the communications network 14. This network may itself comprise other computing objects and computing devices, and may itself represent multiple interconnected networks. In accordance with an aspect of the invention, each object 10*a*, 10*b*, etc. or 110*a*, 110*b*, 110*c*, etc. may contain an application that might make use of an API, or other object, software, firmware and/or hardware, to request use of the processes used to implement the present invention.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 13, computers 110*a*, 110*b*, etc. can be thought of as clients and computer 10*a*, 10*b*, etc. can be thought of as servers, although any computer could be considered a client, a server, or both, depending on the circumstances. Any of these computing devices may be processing data in a manner that implicates the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 9 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110*a*, 110*b*, 110*c*, 110*d*, 110*e*, etc., such as a portable computer, handheld computer, thin client, networked appliance, or other device, such as a VCR, TV, oven, light, heater and the like in accordance with the present invention.

In a network environment in which the communications network/bus 14 is the Internet, for example, the servers 10*a*, 10*b*, etc. can be servers with which the clients 110*a*, 110*b*, 110*c*, 110*d*, 110*e*, etc. communicate via any of a number of known protocols such as HTTP. Servers 10*a*, 10*b*, etc. may also serve as clients 110*a*, 110*b*, 110*c*, 110*d*, 110*e*, etc., as may be characteristic of a distributed computing environment.

Communications may be wired or wireless, where appropriate. Client devices 110*a*, 110*b*, 110*c*, 110*d*, 110*e*, etc. may or may not communicate via communications network/bus 14, and may have independent communications associated therewith. For example, in the case of a TV or VCR, there may or may not be a networked aspect to the control thereof. Each client computer 110*a*, 110*b*, 110*c*, 110*d*, 110*e*, etc. and server computer 10*a*, 10*b*, etc. may be equipped with various application program modules or objects 135 and with connections or access to various types of storage elements or objects, across which files or data streams may be stored or to which portion(s) of files or data streams may be downloaded, transmitted or migrated. Any computer 10*a*, 10*b*, 110*a*, 110*b*, etc. may be responsible for the maintenance and updating of a database, memory, or other storage element 20 for storing data processed according to the invention. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other like devices, and databases 20.

Figure 10:
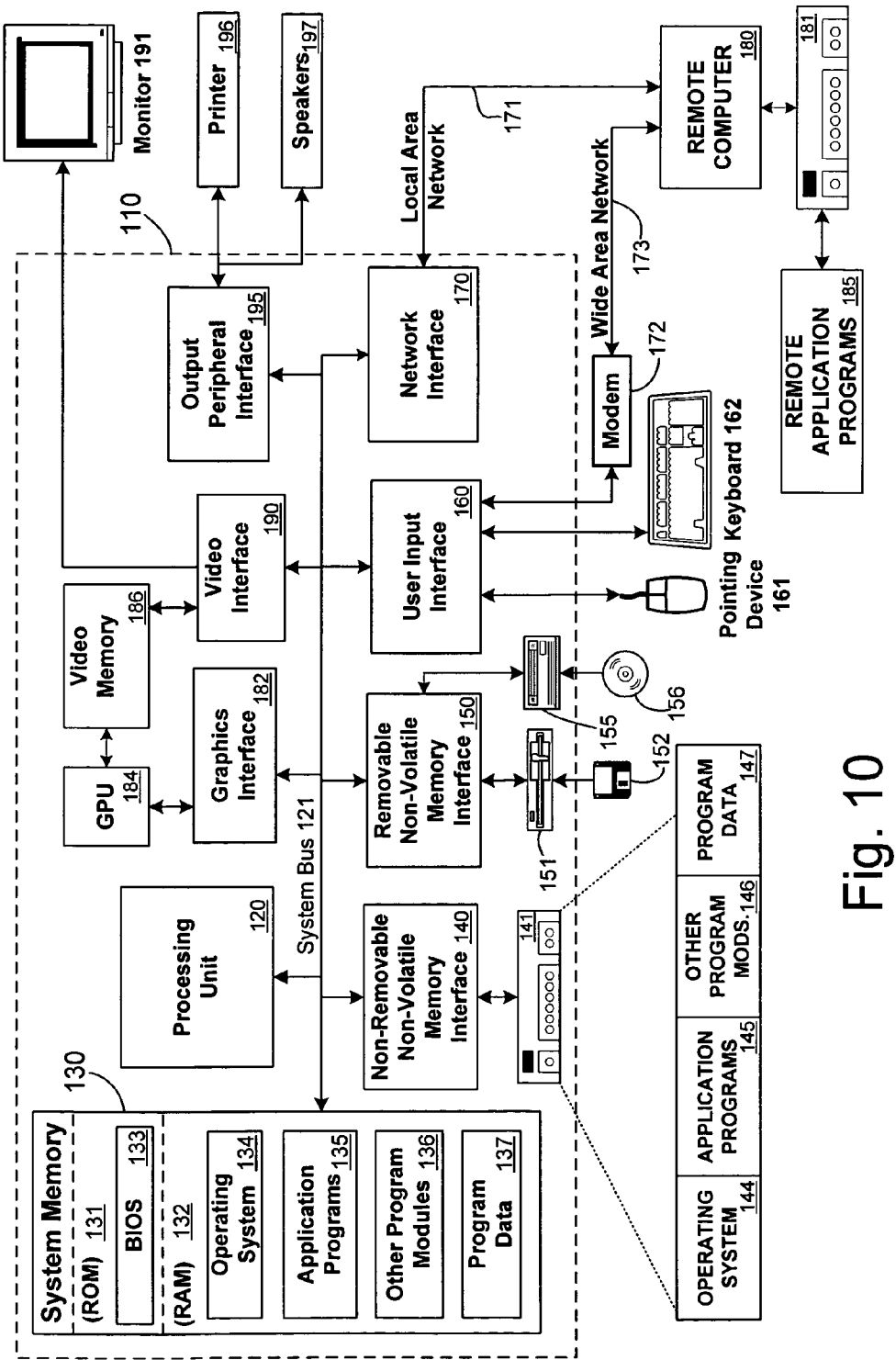
FIG. 10 is a block diagram of an exemplary representing an exemplary computing device in which the present invention may be implemented.

FIG. 10 and the following discussion are intended to provide a brief general description of a suitable computing device in connection with which the invention may be implemented. For example, any of the client and server computers or devices illustrated in FIG. 3 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 10 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10 provide storage of computer readable instructions, data structures, program modules and other data for the computer 110. In FIG. 10, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for prefetching data by resuming a prefetch after stalling at a missing node in a node structure, the method comprising:
   identifying a parent node in the node structure that is a parent of the missing node;
   storing state information for the missing node and at least one ancestor node of the missing node after stalling at the missing node;
   determining, as a function of the state information, whether the parent node has been changed since stalling at the missing node; and
      if not, then resuming the prefetch from the missing node; and
      if so, then selecting a node in the node structure from which to resume the prefetch by determining whether the parent node is still allocated and linked to the node
         if not, then resuming the prefetch from another node in the node structure; and
         if so, then searching the parent node and determining whether a target of the prefetch is within the parent node;
            if not, resuming the prefetch from another node in the node structure; and
            if so, then resuming the prefetch from the parent node,
   whereby resuming the prefetch from the missing node or the selected node reduces processing time associated with the prefetch.

2. The method of claim 1, wherein resuming the prefetch from another node in the node structure comprises:
   ascending the node structure from the parent node to a first unchanged or revalidated ancestor of the parent node; and
   resuming the prefetch from the first unchanged ancestor.

3. The method of claim 1, wherein resuming the prefetch from another node in the node structure comprises:
   resuming the prefetch from a root node of the node structure; and
   descending the node structure from the root node until the target is located.

4. The method of claim 1, wherein resuming the prefetch comprises resuming a descent of a b tree node structure.

5. The method of claim 1, wherein resuming the prefetch comprises resuming a descent of a version store node structure.

6. The method of claim 1, wherein resuming the prefetch comprises resuming a prefetch for data within which a portion of the data is off row data that is stored outside of a corresponding node in a separate structure.

7. The method of claim 1, wherein storing the state information comprises storing a node identifier and a change sequence number for the missing node and the at least one ancestor node of the missing node.

8. The method of claim 7, wherein storing the change sequence number for each node comprises storing a log sequence number for the missing node and the at least one ancestor node of the missing node.

9. The method of claim 7, wherein determining whether the parent node has been changed since stalling at the missing node comprises comparing a stored parent node change sequence number with a current parent node change sequence number; and
   if the current parent node change sequence number is greater than the stored parent node change sequence number, then determining that the parent node has been changed; and
   if the current parent node change sequence number is not greater than the stored parent node change sequence number, then determining that the parent node has not been changed.

10. A method for performing a prefetch consumer operation after completing a prefetch at a completion node in a node structure, the method comprising:
   identifying the completion node;
   storing state information associated with the completion node and at least one ancestor node of the completion node when completing the prefetch;
   determining, as a function of the state information, whether the completion node has been changed since completing the prefetch; and
      if not, then locating a target of the prefetch consumer operation in the completion node; and
      if so, then determining a node of the node structure in which to search for the target by determining whether the completion node is still allocated and linked to the node
         if not, then searching another node in the node structure; and if so, then:
  searching the completion node;
  determining whether the target is within the completion node;
    if not, then:
      determining whether the target is within a range of the completion node;
      if not, then searching another node in the node structure;
      if so, then terminating the prefetch consumer operation; and
    if so, then locating the target in the completion node.

11. The method of claim 10, wherein searching another node in the node structure comprises:
  ascending the node structure from the completion node to a first unchanged or revalidated ancestor of the completion node; and
  descending the node structure from the first unchanged ancestor until the target is located.

12. The method of claim 10, wherein searching another node in the node structure comprises:
  resuming the prefetch from a root node of the node structure; and
  descending the node structure from the root node until the target is located.

13. The method of claim 10, wherein identifying the completion node comprises identifying the completion node of a b tree node structure.

14. The method of claim 10, wherein identifying the completion node comprises identifying the completion node of a version store node structure.

15. The method of claim 10, wherein locating the target of the prefetch consumer operation comprises locating the target of the prefetch consumer operation for data within which a portion of the data is off row data that is stored outside of a corresponding node in a separate structure.

16. The method of claim 10, wherein storing state information comprises storing a node identifier and a change sequence number for the missing node and the at least one ancestor node of the missing node.

17. The method of claim 16, wherein storing the change sequence number for each node comprises storing a log sequence number for the missing node and the at least one ancestor node of the missing node.

18. The method of claim 16, wherein determining whether the completion node has been changed since completing the prefetch comprises comparing a stored completion node change sequence number with a current completion node change sequence number; and
  if the current completion node change sequence number is greater than the stored completion node change sequence number, then determining that the completion node has been changed; and
  if the current completion node change sequence number is not greater than the stored completion node change sequence number, then determining that the completion node has not been changed.

19. A method for prefetching a subsequent key after prefetching a prior key from a node structure, the method comprising:
  identifying an initiation node that a node within a path of the prefetching of the prior key below a root node of the node structure; and
  initiating the prefetching of the subsequent key from the initiation node by
    determining whether the initiation node is still allocated and linked to the node structure;
      if not, then searching another node in the node structure; and
      if so, then searching the initiation node and determining whether the subsequent key is within the initiation node;
        if not, then searching another node in the node structure; and
        if so, then descending the node structure from the initiation node until the subsequent key is located,
  whereby initiating the prefetching of the subsequent key from the initiation node enables the prefetching of the subsequent key to be promptly completed.

20. The method of claim 19, wherein searching another node in the node structure comprises:
  ascending the node structure from the initiation node to an ancestor that includes the subsequent key; and
  descending the node structure until the subsequent key is located.

21. The method of claim 19, wherein searching another node in the node structure comprises:
  resuming the prefetch from a root node of the node structure; and
  descending the node structure from the root node until the target is located.

22. The method of claim 19, wherein identifying an initiation node comprises identifying an initiation node of a b tree node structure.

23. The method of claim 19, wherein identifying an initiation node comprises identifying an initiation node of a version store node structure.

24. The method of claim 19, wherein identifying an initiation node comprises identifying a completion node of the prefetching of the prior key.

25. The method of claim 19, wherein identifying an initiation node comprises identifying a parent of a completion node of the prefetching of the prior key.

26. The method of claim 19, wherein initiating the prefetching comprises initiating the prefetching for data within which a portion of the data is off row data that is stored outside of a corresponding node in a separate structure.

27. The method of claim 19, further comprising, upon completing the prefetching of the prior key, for each of a completion node and ancestors of the completion node, storing a corresponding separator key identifying a range of its associated node.

28. The method of claim 27, comprising identifying the initiation node by comparing the subsequent key with the separator keys.

29. A computer readable storage medium having stored thereon computer executable instructions for performing a process for prefetching a subsequent key after prefetching a prior key from a node structure, the process comprising:
  identifying an initiation node that a node within a path of the prefetching of the prior key below a root node of the node structure; and
  initiating the prefetching of the subsequent key from the initiation node by
    determining whether the initiation node is still allocated and linked to the node structure;
      if not, then searching another node in the node structure; and
      if so, then searching the initiation node and determining whether the subsequent key is within the initiation node;

if not, then searching another node in the node structure; and if so, then descending the node structure from the initiation node until the subsequent key is located, whereby initiating the prefetching of the subsequent key from the initiation node enables the prefetching of the subsequent key to be promptly completed.

30. The computer readable storage medium of claim 29, wherein searching another node in the node structure comprises:

ascending the node structure from the initiation node to an ancestor that includes the subsequent key; and descending the node structure until the subsequent key is located.

31. The computer readable storage medium of claim 29, wherein searching another node in the node structure comprises:

resuming the prefetch from a root node of the node structure; and descending the node structure from the root node until the target is located.

32. The computer readable storage medium of claim 29, wherein identifying an initiation node comprises identifying an initiation node of a b tree node structure.

33. The computer readable storage medium of claim 29, wherein identifying an initiation node comprises identifying an initiation node of a version store node structure.

34. The computer readable storage medium of claim 29, wherein identifying an initiation node comprises identifying a completion node of the prefetching of the prior key.

35. The computer readable storage medium of claim 29, wherein identifying an initiation node comprises identifying a parent of a completion node of the prefetching of the prior key.

36. The computer readable storage medium of claim 29, wherein initiating the prefetching comprises initiating the prefetching for data within which a portion of the data is off row data that is stored outside of a corresponding node in a separate structure.

37. The computer readable storage medium of claim 29, wherein the process further comprises, upon completing the prefetching of the prior key, for each of a completion node and ancestors of the completion node, storing a corresponding separator key identifying a range of its associated node.

38. The computer readable storage medium of claim 37, wherein identifying an initiation node comprises identifying the initiation node by comparing the subsequent key with the separator keys.

* * * * *